US006966326B2

(12) United States Patent
Murray et al.

(10) Patent No.: US 6,966,326 B2
(45) Date of Patent: Nov. 22, 2005

(54) METHOD AND SYSTEM FOR CONTROLLING WITHDRAWAL OF LIQUID PRODUCT FROM PIPELINES

(75) Inventors: Jack B. Murray, Fairfax, VA (US); Rodney V. Kastrup, Gainsville, VA (US); James M. Brown, Flemington, NJ (US)

(73) Assignee: ExxonMobile Research and Engineering Company, Annandale, NJ (US)

( * ) Notice: Subject to any disclaimer, the term of this patent is extended or adjusted under 35 U.S.C. 154(b) by 81 days.

(21) Appl. No.: 10/458,738

(22) Filed: Jun. 11, 2003

(65) Prior Publication Data

US 2004/0250850 A1    Dec. 16, 2004

(51) Int. Cl.[7] ............................ G05D 11/13; G01N 1/10
(52) U.S. Cl. ..................... 137/2; 137/93; 73/863.01; 422/62
(58) Field of Search ............................. 137/2, 3, 4, 88, 137/93, 487.5; 73/35.02, 64.56, 863.01; 422/62; 700/266

(56) References Cited

U.S. PATENT DOCUMENTS

| 2,859,757 | A | * | 11/1958 | Parsons .......................... 137/2 |
| 3,530,867 | A | * | 9/1970 | Hass .............................. 137/3 |
| 3,864,095 | A | * | 2/1975 | Sinclair et al. ................ 137/89 |
| 4,397,958 | A | * | 8/1983 | Vroom ........................ 436/141 |
| 6,182,505 | B1 | * | 2/2001 | Segeral ...................... 73/61.44 |
| 6,382,227 | B1 | * | 5/2002 | Birch et al. .................... 137/3 |

* cited by examiner

*Primary Examiner*—Ramesh Krishnamurthy
(74) *Attorney, Agent, or Firm*—Shook, Hardy & Bacon

(57) ABSTRACT

This invention is to a method and system for controlling withdrawal of liquid from pipelines. The system includes intercommunicating analyzers, control applications and controllers for analyzing and controlling flow of a liquid from a pipeline system. Pipeline systems with which this invention can be used include any type of pipeline system capable of transporting and distributing liquid fluids, particularly hydrocarbon liquids.

31 Claims, 1 Drawing Sheet

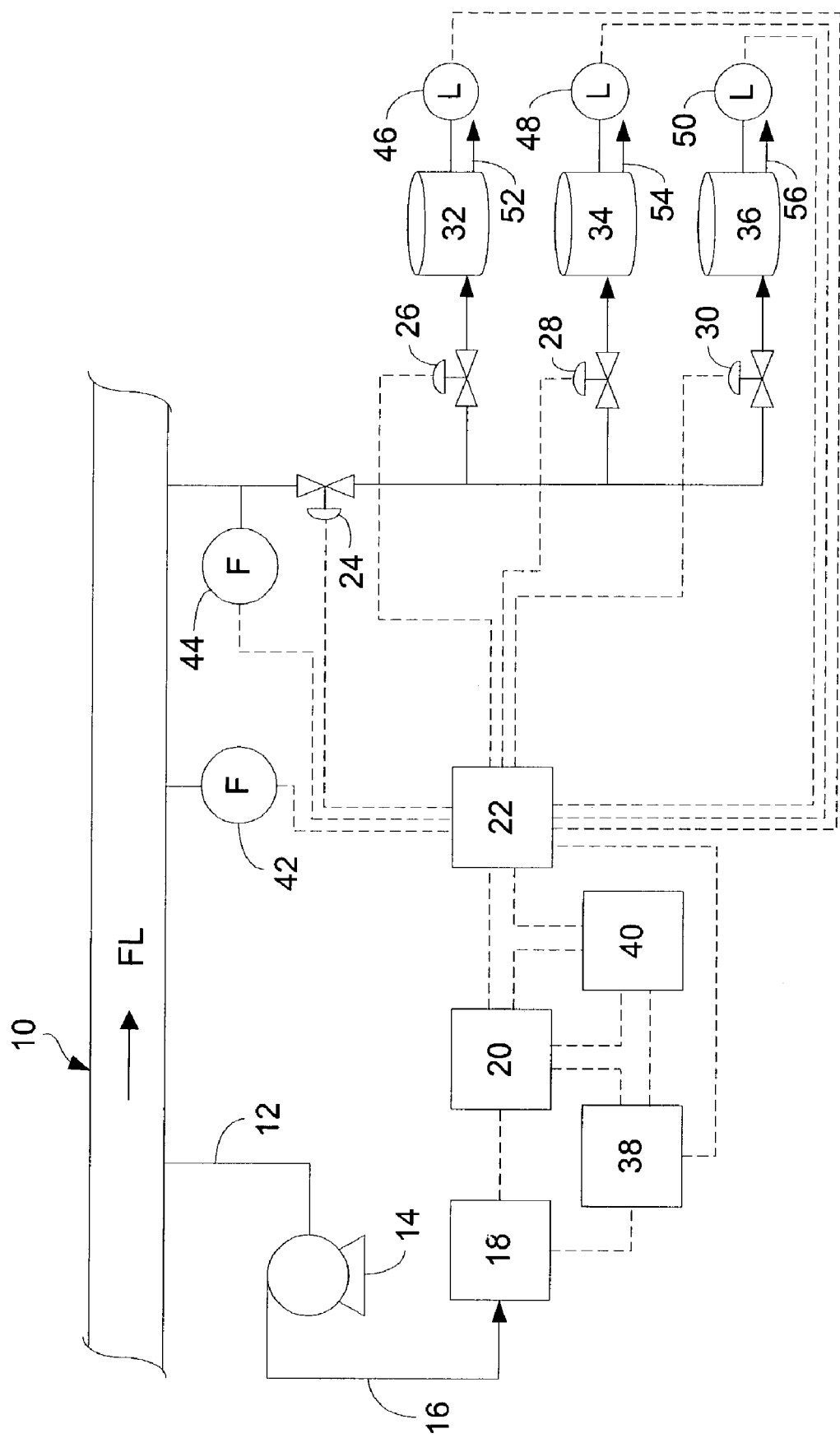
FIGURE

METHOD AND SYSTEM FOR CONTROLLING WITHDRAWAL OF LIQUID PRODUCT FROM PIPELINES

FIELD OF THE INVENTION

This invention is to a method and system for controlling withdrawal of liquid from pipelines. In particular, the invention is to a system and method for analyzing liquid from a pipeline system and directing flow of the liquid in response to the measured characteristics of the analyzed liquid.

BACKGROUND OF THE INVENTION

One major environmental problem confronting the United States and other countries is atmospheric pollution caused by the emission of pollutants as a result of burning fossil fuels. This problem is especially acute in major metropolitan areas. While emissions have been substantially reduced, federal, state and local governments continue to implement regulations which affect the manufacture and use of fossil fuels, in particular the manufacture of gasoline fuels. As a result, refineries have been required to alter their production to produce gasolines that meet the regulations of the federal, state and local governments. These specially formulated, low emission gasolines are often referred to as reformulated gasolines, with California's very strict low emissions gasoline often referred to as California Phase 2 or Phase 3 gasoline.

An example of a low emissions gasoline is disclosed U.S. Pat. Nos. 5,288,393; 5,593,567; 5,653,866; 5,837,126; and 6,030,521 (each issued to Union Oil Company of California). Each of these patents discloses a gasoline composition which is stated to produce low amounts of certain pollutants during combustion. The gasoline reduces pollution by having a decreased 50% D-86 distillation point; a decreased olefin content; an increased paraffin content; a decreased Reid vapor pressure; an increased research octane number; a decreased 10% D-86 distillation point; a decreased 90% D-86 distillation point; and an increased aromatic content.

Another example of a low emissions gasoline is disclosed in U.S. Pat. No. 6,328,772 (issued to Chevron). This patent discloses a fuel that is blended to meet the California Code of Regulations. The fuel is made by blending a gasoline blend stock having predetermined RVP and T50 specifications at a refinery which does not contain ethanol, transporting the blend stock through a pipeline to a terminal, and mixing the ethanol and blend stock at the terminal such that the final gasoline composition meets the California Code of Regulations. The patent indicates that the method allows one to avoid the problems inherent in transporting an ethanol containing gasoline formulation to its desired destination, while meeting all required specifications for the gasoline.

Transporting special fuel compositions such as those described above, can be quite problematic in itself. Fuels, as well as a variety of hydrocarbons, are typically transported many miles through huge pipeline systems. There are many thousands of miles of pipelines throughout the world, particularly in North America and the Middle East, and these pipelines are capable of carrying multiple fluids along the same line to numerous destinations, with the fluids varying substantially in composition. In order to ensure that a specified fluid gets to a specified destination, pipeline systems include complex switching arrangements to route the various fluids in accordance with their intended application and destination. Due to the complexities of pipeline switching, as well as inconsistencies in flow, maintenance issues, and even operator error, fluid identification and error-free distribution is very difficult, if not impossible, in some cases.

U.S. Pat. No. 5,485,148 (issued to Teng) discloses a pipeline fluid tagging system. The system uses an electronic transmitter to identify fluid location in a pipeline. The transmitter is enclosed in a housing and the housing travels along with the fluid in the pipeline, transmitting signals representative of information relating to the fluid, such as fluid type, fluid quantity and destination.

There exists a need for a system to ensure efficient, highly predictable identification of flowing fluids, specialty gasolines in particular, throughout the numerous miles of existing pipelines. There is also a need for a system which allows for efficient distribution of such fluids. Such a system would also provide for the reduction of waste and potential errors related to the task of getting the fluids to their desired destination.

SUMMARY OF THE INVENTION

This invention provides a method and system for identifying flowing liquids in a pipeline. The invention further provides a method and system in which fluids can be efficiently distributed at desired withdrawal locations.

In one embodiment, this invention provides a system for analyzing and directing flow of a liquid in a pipeline. The system comprises intercommunicating analyzers, control applications and controllers for analyzing and comparing one or more characteristics or calculated values of the liquid in the pipeline and controlling discharge and collection of the liquid from the pipeline based on the one or more measured characteristics or values.

In another embodiment of the invention, the intercommunicating sensors and controls include one or more analyzers which analyzes one or more characteristics of the liquid in the pipeline; one or more control applications in communication with the one or more analyzers which compares one or more of the analyzed characteristics or a calculated value of one or more of the analyzed characteristics against a predetermined standard; and one or more flow controllers in communication with the one or more control applications which controls the direction the flow of the fluid in the pipeline.

The invention further provides a system for analyzing and directing the flow of a liquid in a pipeline which comprises a sample transport system which transports at least a portion of the liquid in the pipeline. The system can further include an analyzer in communication with the sample transport system which receives the transported liquid portion and analyzes one or more characteristics of the transported liquid.

In another embodiment of the system, there is provided a control application in communication with the analyzer which compares one or more of the analyzed characteristics or a calculated value of one or more of the analyzed characteristics against a predetermined standard. Further provided can be a flow controller in communication with the control application which controls the direction of flow of the fluid in the pipeline in response to the one or more compared characteristics or values.

The invention also provides a method for analyzing and directing flow of a liquid in a pipeline system. In one embodiment, the method includes withdrawing at least a portion of the liquid in the pipeline system; analyzing the withdrawn liquid for one or more characteristics; comparing one or more of the analyzed characteristics against a predetermined standard; and directing the flow of the liquid in the pipeline system in response to the one or more compared characteristics.

In another aspect of the invention, there is provided a method which includes withdrawing a portion of the liquid flowing through the pipeline system; analyzing at least one characteristic of the withdrawn liquid; calculating a value based on the analyzed characteristic; comparing the calculated value against a predetermined standard; and directing the flow of the liquid in the pipeline system in response to the compared value.

In the invention, the liquid can be selected from the group consisting of gasoline, diesel, jet fuel, kerosene, heating oil, LPG, LNG, furnace fuels, hydrocarbon solvents, lubricants, refinery streams and chemical plant streams. Preferably, the liquid is gasoline.

The analyzed characteristic of the liquid can be either a physical characteristic of the liquid, or a chemical characteristic of the liquid. Example characteristics include vapor pressure, research octane number, motor octane number, octane value, distillation value, olefin concentration, paraffin concentration, aromatic concentration, benzene concentration, oxygen concentration, oxygenate concentration, sulfur content, cetane number, cetane index, cloud point, flash point, kinematic viscosity, copper strip corrosion, Ramsbottom carbon residue, ash content, freeze point, vapor pressure, hydrogen content, naphthalene content, smoke point, luminometer number, corrosion, net heat of combustion, viscosity, viscosity index, and volatility.

BRIEF DESCRIPTION OF THE DRAWING

One embodiment of invention is shown in the attached FIGURE, which is a schematic of a system having intercommunicating analyzers, control applications and controllers for analyzing and controlling flow of a liquid from a pipeline system.

DETAILED DESCRIPTION OF THE INVENTION

This invention provides a method and system for analyzing and directing flow of a liquid in a pipeline system. The liquid is analyzed for quality and is moved through the pipeline in response to the type of quality exhibited by the fluid.

In one embodiment of the invention, the system includes intercommunicating analyzers, control applications, and controllers for analyzing and comparing one or more characteristics of the liquid in the pipeline and controlling discharge and collection of the liquid from the pipeline. Based on compared characteristics, the liquid is accepted or rejected for withdrawal from the pipeline system. If accepted, the compared characteristics can be further used to determine to which location the liquid will be sent.

Pipeline systems in which this invention can be used include any type of pipeline capable of transporting and distributing liquid fluids, particularly hydrocarbon liquids. Such pipeline systems include those types of pipelines owned, operated or used by any of the commercial pipeline companies listed by the Federal Energy Regulator Commission's List of Oil Pipeline Companies Taken from Currently Effective Oil Pipeline Tariffs. See the website http://www.ferc.fed.us/oil/oil_list.htm. Such pipeline systems are particularly suited for transporting and/or distributing hydrocarbon liquids used as fuels or other commodity chemicals, or any liquid that can be analyzed according to this invention.

Liquids that are analyzed and directed in accordance with this invention can be any liquid capable of being transported through complex series of pipelines. Examples of such liquids include gasoline (motor, aviation and others), diesel, jet fuel, kerosene, heating oil, LPG, LNG, furnace fuels, hydrocarbon solvents, lubricants, refinery streams and chemical plant streams. In a preferred embodiment, the liquids are selected from the group consisting of gasoline, diesel, jet fuel, kerosene, and heating fuel.

In this invention, the liquid is flowed through a pipeline system from an initial point to a withdrawal point. For example, the liquid can start out from a refinery or chemical plant as an initial point, and be transported to one or more common or commercial pipeline systems such as any of those described above. The liquid flows through any number of pipelines before it is withdrawn at a withdrawal or destination point.

Arrival of the liquid at a withdrawal point can be estimated using conventional flow estimation techniques. An example of one technique is to use one or more volumetric flow meters to determine flow rate of the liquid through the pipeline. Once the flow rate of the liquid and the distance to the withdrawal point from the flow meter are known, the time of arrival of the liquid at the withdrawal point can be calculated. However, because pipeline systems are quite complex, and include a number of liquid input and withdrawal locations, a number of variables may need to be considered. Since it may be that only the pipeline companies shipping the liquids have access to all the variable information involved in the shipping process, the pipeline companies will generally set a schedule of shipments and delivery times to users of the pipeline system. This way the users will not need to perform calculations to determine approximate time of arrival of shipped liquid.

In order to ensure that the liquid has not been contaminated along its flow through the pipeline system, or that the pipeline scheduling system is accurate, it is desirable to analyze or measure a portion of the liquid from the pipeline prior to discharge at the destination point. In order to analyze or measure a portion of the liquid from the pipeline, a slip stream is run from the pipeline to an analysis system. The slip stream can be run directly to the analysis system or it can be run as a bypass loop around the pipeline, with a separate line run from the bypass loop to the analysis system.

One or more characteristics or values of the liquid can be measured and/or calculated as desired in the analysis system. Any value that is actually measured can be an actual characteristic of the system or it may be a value that can be used to calculate a characteristic of the liquid. The analysis system can include one or more analyzers that measure one or more characteristics or values, depending upon the capability of each analyzer in the system.

Once an analyzer measures an appropriate characteristic of the liquid or calculates an appropriate value based on the measured characteristic, that characteristic or value is compared to a predetermined value or characteristic using a control application. The predetermined characteristic or value can be included in a listing or database of one or more acceptable quality ranges of one or more characteristics or values of the liquid being transported through the pipeline system. When the control application determines that the liquid has characteristics or values within acceptable quality limits (i.e., is "on spec"), it can be withdrawn from the pipeline, and routed to a predetermined location. If a characteristic or value of the liquid is not within acceptable quality limits (i.e., is "off spec"), it can be refused withdrawal at its destination, or routed to an alternate, predetermined location.

Withdrawal of a liquid sample from the pipeline or a bypass stream taken off the pipeline can be continuous, although it need not be. Samples can be intermittently withdrawn and analyzed over a period of time, so long as the withdrawal is sufficient to accurately determine quality of the entire shipment of the liquid that is to be taken from the pipeline by the user. Once the analysis system determines that the liquid meets the appropriate quality requirements, withdrawal of the liquid from the pipeline system can begin. Withdrawal can continue until the appropriate volume is reached, or as long as the desired liquid quality is maintained. It is possible to continue withdrawal even after the appropriate volume is withdrawn or appropriate quality is no longer met, as long as there is a sufficient tankage or bypass system to which the additional or "off spec" liquid can be transported.

Withdrawal of the liquid from the pipeline system is controlled and directed by a flow control system or a flow controller, which can be incorporated into the system of the invention. The flow controller communicates with various flow meters to determine the rate of liquid withdrawal or rate of transport through any type of pipe or network of pipes. This, therefore, allows the volume of liquid withdrawn or transported through a pipe or network of pipes to be determined. Once the appropriate volume of liquid is withdrawn or transported, the flow controller signals or actuates flow control valves to stop liquid flow or divert the flow of liquid to an alternate route. The flow valves are directed by the controller to function in response to the rate or volume of flow of the liquid or in response to the measured or determined characteristics of the fluid.

In one embodiment, the system of the invention includes a sample transport system which is arranged to withdraw a sample of liquid from the pipeline and transport the sample to one or more analyzer systems. The sample of liquid can be withdrawn directly from the pipeline or it can be taken from a bypass loop off of the pipeline. The sample transport system can include any type of pumping device capable of transporting a slipstream from the pipeline or bypass loop to an analyzer. Any conventional pumping device can be used. Examples of such a pumping device include centrifugal pumps, reciprocating pumps, and gear pumps.

The analyzer portion of the analyzer system is used to measure one or more characteristics of the liquid collected from the sample transport system. In addition, the analyzer can include appropriate hardware and software to calculate one or more characteristic values of the liquid based on the measured values. The hardware or software can be located internal or external to the analyzer itself, and any conventional means which can be used to perform such calculation function can be used.

In one embodiment, the analyzer portion of the analyzer system is used to measure one or more chemical characteristics of the fluid. In another embodiment, the analyzer portion of the system is used to measure one or more physical characteristics. In yet another embodiment, the analyzer portion of the invention can be used to measure other characteristics of the liquid which cannot be strictly classified as chemical or physical. Such other characteristics of the liquid include characteristics of the liquid which are measured indirectly through other measurements or calculations, including measuring characteristics of reaction or degradation products of the liquid.

Examples of chemical characteristics of the liquid which can be measured include olefin concentration, paraffin (saturates) concentration, aromatic concentration, benzene concentration, oxygen concentration, sulfur content, hydrogen content, and naphthalene content. Examples of physical characteristics of the liquid which can be measured include vapor pressure (e.g., Reid vapor pressure (RVP)), research octane number (RON), motor octane number (MON), octane value ((RON+MON)/2), distillation value (e.g., T10, T50, T90, E70, E100, E200, E300, E305, E350, E360), cetane number, cetane index, cloud point, flash point, kinematic viscosity, freeze point, vapor pressure, luminometer number, net heat of combustion, viscosity, viscosity index, and volatility. Other characteristics which can be measured include corrosion (e.g., copper strip corrosion), Ramsbottom carbon residue, ash content, and smoke point. Note, however, that some characteristics, including those described herein, may be included in more than one category due to the inexact nature of determining what is chemical, physical or something else. Therefore, certain measured characteristics can belong to more than one category, and be analyzed by more than one type of analyzer device.

Analyzers which can be used in this invention can be any type of machine capable of relatively quickly and accurately measuring the desired liquid characteristic or characteristics. Preferred analyzers are those that are capable of measuring more than one liquid characteristic.

Examples of analyzers that can be used in this invention include infrared analyzers, preferably Fourier Transform Infrared (FTIR) analyzers. In general, these types of analyzers measure the infrared spectrum of a sample and use multivariate models to correlate the measured spectrum to a variety of characteristics. For example, the infrared analyzers can used to measure research octane number, motor octane number, aromatics, olefins, saturates (i.e., paraffins), benzene, distillation points (e.g., T10, T50, T90, E70 (° C.), E100 (° C.), E200 (° F.), E300 (° F.)), oxygenate content (e.g., MTBE, TAME, ethanol, etc.), RVP, density (i.e., specific gravity) of gasolines. In addition, these analyzers can be used to measure cetane number, cetane index, cloud point, cold filter plugging point (CFPP), density (i.e., specific gravity) distillation points (e.g., T10, T50, T90, E305 (° C.), E350 (° C.), E360(° C.)), flash point, aromatics, cetane improver content in diesel fuels. In jet fuels and kerosenes, the infrared analyzers can be used to measure distillation points, flash point, freeze point, aromatic content, and hydrogen content. In lube oils, the infrared analyzers can be used to measure viscosity index and Noack volatility. Such analyzers are be procured through manufacturers such as Hamilton Sundstrand (e.g., Analect brand) and ABB (e.g., Bomem brand).

Another example of an analyzer that can be used in this invention is a gas chromatography (GC) device. This type of analyzer can be used, for example, to measure distillation points (e.g., using simulated distillation according to ASTM D-3710), benzene content, aromatics content, oxygenates (e.g., MTBE), and RVP of gasolines. Another example is for measuring distillation points (e.g., using simulated distillation according to ASTM D-2887) of diesel fuels. Such analyzers can be procured through manufacturers such as Siemens AAI, ABB and Foxboro.

Another example of an analyzer that can be used in this invention is an on-line device to measure RVP. For example, such a device can be used in accordance with ASTM D-5191. One manufacturer of such as device is ABB (e.g., 4100 model).

Still another example of an analyzer that can be used in this invention is a pyroluminescence device. Preferably, such devices measure sulfur in the range of from about 1 to about 500 wppm. In general, these devices measure sulfur content by converting the sulfur to $SO_x$ (a majority of which is $SO_2$, but including a trace or measurable quantity of $SO_3$ and SO), and detecting the $SO_x$ with UV fluorescence. This device is preferably run in accordance with ASTM D-5453. Manufacturers include Antek (e.g., 6000 series), ThemoOnix (SOLA), ABB (e.g., 2007 GC with FPD detector).

Yet another example of an analyzer that can be used in this invention is a knock engine. Such a device can be used to measure research octane number and motor octane number. A manufacturer of such a device is Waukesha.

Another example of an analyzer that can be used in this invention is gas chromatograph-mass spectrophotometer (GC-MS). In general, this device can be used in measuring the types of characteristics measured by infrared analyzer. However, this device also has the ability to measure sulfur content, particularly low level sulfur content.

Physical property analyzers can also be used in this invention. Examples of physical properties that can be measured include distillation points (e.g., using ASTM D-86), freeze point, cloud point, pour point, CFPP, vapor pressure, viscosity, and flash point. Such analyzers can be acquired through manufacturers such as Benke, Sysco, Analytics, Rosemount, and ABB Fluidstem.

The collected liquid can be measured for one or more characteristics intermittently or continuously. It is more desirable, however, to measure the collected liquid continuously.

After the liquid is analyzed and/or any characteristic values calculated, a control application is used to compare the measured and/or calculated values against a predetermined standard. Once a selected characteristic or calculated value of the collected sample matches a predetermined standard (i.e., is determined to be on-spec), the control application works in conjunction with the flow controller to open a valve or series of valves to divert flow from the pipeline to a storage vessel. Such a storage vessel could include a terminal tank or tanks.

If the control application detects a deviation from the desired characteristic (i.e., determines that the liquid is off-spec), the control application and flow controller take action to divert flow back to the pipeline, or to a tank holding off-spec material. If the control application detects no deviation from the desired characteristic or characteristics (i.e., determines that the liquid is on spec), the control application maintains flow into the storage vessel until the flow volume reaches a predetermined volume, at which time the control application and flow controller act to close the valves or series of valves diverting flow from the pipeline. Of course, the control application and flow controller can work as a single unit or as separate units using any conventional means, as long as such means provides the dual function of comparing data and controlling flow control valves in response to the compared data.

The invention also provides for correlation of a measured characteristic into different units. For example, once a measurement of a specific characteristic is made, a correlator can be used to correlate the measured characteristic to different or corresponding units. This is particularly efficient when different measurements are required to be reported to different governmental agencies for the same characteristic. Such measurements are referred to herein as government reportable units.

One specific example of a government reportable unit is RVP for motor gasoline. The Environmental Protection Agency (EPA) requires one method of measuring RVP, whereas the California Air Resources Board (CARB) requires a substantially different method. Using these different methods can result in a substantial difference in RVP value. Since these methods are correlatable, however, the optional correlator can correlate the measured RVP value derived using one method to calculate the RVP value using another method.

In this invention, correlation is preferably performed by mathematical manipulation of but one measured number. It is not necessary to reanalyze the pipeline sample using multiple analysis methods, although this could be done if desired. Therefore, the correlator of this invention preferably recalculates one or more measured characteristics into different units or measurements using conventional mathematical means.

Once the control application determines whether the liquid is within acceptable quality limits, it can be accepted or rejected for withdrawal from the pipeline system. If accepted for withdrawal, the liquid is directed to the desired location. For example, once it is determined that the liquid meets the appropriate specifications, a control application will send signals such as 4–20 mA analog signals, or digital signals (open or closed) to appropriate control valves to direct the liquid from the pipeline to the desired location, such as a storage vessel. Such a vessel can be a storage tank located in a terminal receiving area.

This invention also provides for an optional blend calculator. The blend calculator is used when it is intended to withdraw liquid from the pipeline system, and direct the liquid to a vessel, such as a storage tank, that is not empty. In such a situation, liquid in the storage vessel will likely have an impact on final product quality of any liquid that is put into the vessel. The blending calculator is programmed to predict the product quality of a blend of any liquid in a storage vessel and the liquid withdrawn from the pipeline. Programming can be by any conventional means such as standard linear programming methods. Such programs typically function by taking the analyzed characteristics or calculated values of the of the liquid in the pipeline, as well as analyzed characteristics or calculated values of liquid already in the storage vessel in which blending will occur, and calculating or estimating corresponding characteristics of a blend of the liquid in the pipeline and the liquid in the storage vessel.

Further provided in this invention is one or more optional vessel level sensors, and integrated flow controller or controllers. The level sensors are equipped to monitor the level of one or more storage vessels used in storing liquid withdrawn from the pipeline system. When the liquid level of a storage vessel a specified level (i.e., a maximum acceptable level), the level sensor senses that the level is reached, the system responds by controlling the flow through one or more control valves to redirect or shut off liquid flow.

In one embodiment of the invention, gasoline is the liquid being transported through the pipeline system. Prior to arriving at the withdrawal point, a slip stream of the gasoline is removed from the pipeline and analyzed. The gasoline is analyzed for one or more of gasoline characteristics selected from the group consisting of RVP, distillation point, olefin content, paraffin content, aromatics content, and octane value, with octane value being defined as the average of the research octane number and motor octane number ((RON+MON)/2). The analyzed characteristic is then compared to a set or acceptable standard.

A desirable RVP standard for gasoline is one that is not greater than about 10.0 psi (69 kPa). Preferably, the RVP standard is not greater than about 8.5 psi (59 kPa), more preferably not greater than about 8.0 psi (55 kPa), and most preferably, not greater than about 7.5 psi (14 kPa). For consistency, it is desirable to measure the RVP of gasoline according to any on-line method that correlates to the current method required by the U.S. Environmental Protection Agency.

Desirable distillation points for gasoline are those corresponding to the T10, T50 and T90 points as defined by the American Society of Testing Materials (ASTM), in particular by method ASTM D-86. Preferably the D-86 T10 distillation point is not greater than about 165° F. (74° C.), more preferably not greater than about 160° F. (71° C.), and most preferably not greater than about 155° F. (68° C.). The D-86 T50 distillation point is preferably not greater than about 225° F. (107° C.), more preferably not greater than about 220° F. (104° C.), and most preferably not greater than about 215° F. (102° C.). The D-86 T90 distillation point is preferably not greater than about 330° F. (166° C.), more preferably not greater than about 320° F. (160° C.), and most preferably not greater than about 310° F. (154° C.).

A desirable olefin content is one that is not greater than about 20 volume percent. Preferably olefin content is not greater than about 15 volume percent, more preferably not greater than about 12 volume percent, and most preferably not greater than about 10 volume percent. For consistency, it is desirable to measure the olefin content of gasoline according to any on-line method that correlates to the current method required by the U.S. Environmental Protection Agency.

A desirable paraffin content of gasoline is one that is at least about 50 volume percent paraffins. Preferably the paraffin content is at least about 55 volume percent, more preferably at least about 60 volume percent, and most preferably at least about 65 volume percent. For consistency, it is desirable to measure the paraffin content using any on-line measurement that is correlatable to ASTM D-1319, excluding the presence of any oxygenates (e.g., ethanol, MTBE, etc.) in calculating the paraffin content.

A desirable aromatics content of gasoline is one in which the gasoline contains not greater than about 20 volume percent aromatics. Preferably, the gasoline contains not greater than about 15 volume percent, more preferably not greater than about 10 volume percent, and most preferably not greater than about 5 volume percent. For consistency, it is desirable to measure the aromatics content that correlates to the current method required by the U.S. Environmental Protection Agency.

A desirable octane value is one that is at least the lowest value acceptable to the U.S. Automobile Manufacturers Association. Preferably, the octane value is at least about 85, more preferably at least about 86, and most preferably at least about 87.

Following analysis of the gasoline, the value of each measured characteristic is compared against a predetermined standard using a control application. If one or more of the measured characteristics does not meet its corresponding predetermined standard value, the gasoline can be accepted or rejected for pipeline withdrawal as desired. Even if the gasoline does not meet the desired standards, the system of this invention provides flow controllers that allow such liquid to be sent to a specific storage area for further processing, reblending, or as a holding area until a return shipping schedule can be arranged. If the gasoline does meet all predetermined standards, it can be withdrawn directly from the pipeline system and sent to a desired storage area where it will be available for further shipment or immediate sales as a finished gasoline product.

One example of the system of this invention is shown in the FIGURE. In the FIGURE, liquid is sampled directly from a pipeline 10. In a preferred embodiment, however, a liquid sample can be taken from a bypass or slipstream the pipeline 10 (not shown). The bypass or slipstream has an advantage that such an arrangement simplifies maintenance and other hook up problems to the analysis equipment.

A sample of flowing liquid (FL) is withdrawn from the pipeline 10 by way of a sample transport system, which in this embodiment comprises a line 12, a sample pump 14, and a line 16. The liquid sample is pumped through the line 16, and sent to analyzer 18. Analyzer 18 is equipped to analyze one or more characteristics of the liquid. In this embodiment, the analyzer 18 is also equipped to calculate one or more characteristic values of the liquid based on one or more of the characteristics actually analyzed.

Following analysis of the liquid sample, the measured characteristics and/or calculated values are compared against a predetermined standard by a control application 20. The predetermined standard incorporated into the control application 20 is essentially a database storage of acceptable characteristics or acceptable values based upon measured characteristics.

Once the control application 20 determines if the liquid sample from pipeline system is acceptable, it then sends signals to a flow controller or control system 22 which acts to direct flow valves 24, 26, 28, and 30 to open or close so as to direct the liquid in the pipeline 10 into the desired storage tanks 32, 34, and 36. Although the control application 20 and flow controller 22 are shown as separate units, they do not need to be two separate physical units. A single unit can be used as long as the functions represented by the control application 20 and flow controller 22 are performed; that is, the functions of comparing data and acting to open or close flow control valves based on the data comparison.

If desired, one or more measurements from analyzer 18 can be correlated to different units or measurements using a correlator 38. Values from analyzer 18 are input to correlator 38, new units or measurements are calculated, and those values are sent to control application 20, and used to direct the flow of liquid withdrawal from the pipeline 10. The correlator 38 can also directly communicate with flow control system 22 or a blend calculator 40. The function of the correlator 38 can also be combined in a single unit with the control application 20, if desired.

Blend calculator 40 is used to estimate the final product characteristics of a blend of the liquid being withdrawn from pipeline system, and liquid already present in storage tanks, 32, 34 or 36. Once an acceptable blend is calculated, flow valves 24, 26, 28 and 30 are controlled to make the appropriate blend. As with the correlator 38 and flow controller 22, the function of the blend calculator 40 can be combined with the control application 20 as a single unit, if desired.

The flow controller 22 is also shown in communication with flow meters 42 and 44. The flow controller 22 determines the rate of flow of liquid through these meters, calculates when to withdraw liquid from pipeline system, and sends appropriate signals to open and/or close flow valve 24.

Optional level controls are also shown in the FIGURE. Level meters or indicators 46, 48, and 50 are used to measure liquid level in each of storage tanks, 32, 34 and 36, respectively. Once the level in any one of the tanks reaches the maximum acceptable level, signals are sent to flow control system 22, which operates the appropriate valve 24, 26, 28 or 30 to stop or redirect liquid flow. Exit lines 52, 54, 56 from storage tanks, 32, 34 and 36, respectively, can be used to redirect liquid from the storage tanks to other locations. For example, the exit lines 52, 54, 56 can be connected to off spec storage tanks, or the exit lines can be in communication with pipelines running to unloading or other terminal facilities.

Having now fully described this invention, it will be appreciated by those skilled in the art that the invention can be performed within a wide range of parameters within what is claimed, without departing from the spirit and scope of the invention.

What is claimed is:

1. A system for analyzing and directing flow of a liquid in a pipeline, comprising the following components:
   one or more analyzers which measures one or more characteristics of the liquid or calculates a value based on the measured characteristic;
   one or more control applications in communication with the one or more analyzers which compare the one or more of the characteristics, or the calculated value, against a predetermined value or characteristic; and
   one or more flow controllers in communication with the one or more control applications which control the direction of flow of the liquid in the pipeline,
   wherein said system controls the acceptance, rejection, discharge and collection of the liquid from the pipeline based on the one or more measured characteristics or values.

2. The system of claim 1, wherein the system includes at least one analyzer which can measure at least one characteristic of a liquid selected from the group consisting of gasoline, diesel, jet fuel, kerosene, heating oil, LPG, LNG, furnace fuels, hydrocarbon solvents, lubricants, refinery streams and chemical plant streams.

3. The system of claim 2, wherein the liquid is gasoline.

4. The system of claim 1, wherein the system includes at least one analyzer which can measure at least one physical characteristic of the liquid.

5. The system of claim 1, wherein the system includes at least one analyzer which can measure at least one chemical characteristic of the liquid.

6. The system of claim 1, wherein the system includes at least one analyzer which can measure at least one characteristic selected from the group consisting of vapor pressure, research octane number, motor octane number, octane value, distillation value, olefin concentration, paraffin concentration, aromatic concentration, benzene concentration, oxygen concentration, oxygenate concentration, sulfur content, cetane number, cetane index, cloud point, flash point, kinematic viscosity, copper strip corrosion, Ramsbottom carbon residue, ash content, freeze point, vapor pressure, hydrogen content, naphthalene content, smoke point, luminometer number, corrosion, net heat of combustion, viscosity, viscosity index, and volatility.

7. The system of claim 1, wherein the predetermined value or characteristic is included in a listing or database of one or more characteristics or values of the liquid being transported.

8. A system for analyzing and directing the flow of a liquid in a pipeline, comprising
   sample transport system which transports at least a portion of the liquid in the pipeline;
   analyzer in communication with the sample transport system which receives the transported liquid portion and analyzes one or more characteristics of the transported liquid;
   control application in communication with the analyzer which compares one or more of the analyzed characteristics or a calculated value of one or more of the analyzed characteristics against a predetermined value or characteristic; and
   flow controller in communication with the control application which controls the acceptance, rejection and direction of flow of the fluid in the pipeline in response to the one or more compared characteristics or values.

9. The system of claim 8, wherein the sample transport system includes a pump.

10. The system of claim 8, wherein the system includes at least one analyzer which can measure at least one physical characteristic.

11. The system of claim 8, wherein the system includes at least one analyzer which can measure at least one chemical characteristic.

12. The system of claim 8, wherein the system includes at least one analyzer which can measure at least one characteristic selected from the group consisting of vapor pressure, research octane number, motor octane number, octane value, distillation value, olefin concentration, paraffin concentration, aromatic concentration, benzene concentration, oxygen concentration, oxygenate concentration, sulfur content, cetane number, cetane index, cloud point, flash point, kinematic viscosity, copper strip corrosion, Ramsbottom carbon residue, ash content, freeze point, vapor pressure, hydrogen content, naphthalene content, smoke point, luminometer number, corrosion, net heat of combustion, viscosity, viscosity index, and volatility.

13. The system of claim 8, wherein the predetermined value or characteristic is included in a listing or database of one or more characteristics or values of the liquid being transported.

14. The system of claim 8, further comprising one or more valves in the pipeline, and the flow controller operates to open and close the one or more valves so that the liquid is directed to one or more storage vessels.

15. The system of claim 8, further comprising a correlator which correlates at least one measured characteristic into one or more different units.

16. The system of claim 15, wherein at least one of the different units corresponds to a government reportable unit.

17. The system of claim 8, further comprising a blend calculator which takes the analyzed characteristics or calculated values of the liquid in the pipeline, and analyzed or calculated characteristics of liquid in a storage vessel, and calculates corresponding values of a blend of the liquid in the pipeline and the liquid in the storage vessel.

18. The system of claim 8, wherein the system further includes at least one vessel level sensor in communication with at least one flow meter, which operates to shut off flow to a storage vessel.

19. A method for analyzing and directing flow of a liquid in a pipeline system, comprising:
   withdrawing at least a portion of the liquid in the pipeline system;
   analyzing the withdrawn liquid for one or more characteristics;
   comparing one or more of the analyzed characteristics against a predetermined value or characteristic using an application; and accepting or rejecting and, if accepted, directing the flow of the liquid in the pipeline system in response to the one or more compared characteristics.

20. The method of claim 19, wherein the liquid is selected from the group consisting of gasoline, diesel, jet fuel, kerosene, heating oil, LPG, LNG, furnace fuels, hydrocarbon solvents, lubricants, refinery streams and chemical plant streams.

21. The method of claim 20, wherein the liquid is gasoline.

22. The method of claim 19, wherein at least one of the analyzed characteristics is a physical characteristic of the liquid.

23. The method of claim 19, wherein at least one of the analyzed characteristics is a chemical characteristic of the liquid.

24. The method of claim 19, wherein at least one of the analyzed characteristics is selected from the group consisting of vapor pressure, research octane number, motor octane number, octane value, distillation value, olefin concentration, paraffin concentration, aromatic concentration, benzene concentration, oxygen concentration, oxygenate concentration, sulfur content, cetane number, cetane index, cloud point, flash point, kinematic viscosity, copper strip corrosion, Ramsbottom carbon residue, ash content, freeze point, vapor pressure, hydrogen content, naphthalene content, smoke point, luminometer number, corrosion, net heat of combustion, viscosity, viscosity index, and volatility.

25. A method for analyzing and directing flow of a liquid in a pipeline system, comprising:
   withdrawing a portion of the liquid flowing through the pipeline system;
   analyzing at least one characteristic of the withdrawn liquid;
   calculating a value based on the analyzed characteristic;
   comparing the calculated value against a predetermined value or characteristic using an application; and
   accepting or rejecting, and if accepted, directing the flow of the liquid in the pipeline system in response to the compared value.

26. The method of claim 25, wherein the liquid is selected from the group consisting of gasoline, diesel, jet fuel, kerosene, heating oil, LPG, LNG, furnace fuels, hydrocarbon solvents, lubricants, refinery streams and chemical plant streams.

27. The method of claim 26, wherein the liquid is gasoline.

28. The method of claim 25, wherein at least one of the analyzed characteristics is a physical characteristic of the liquid.

29. The method of claim 25, wherein at least one of the analyzed characteristics is a chemical characteristic of the liquid.

30. The method of claim 25, wherein at least one of the analyzed characteristics is selected from the group consisting of vapor pressure, research octane number, motor octane number, octane value, distillation value, olefin concentration, paraffin concentration, aromatic concentration, benzene concentration, oxygen concentration, oxygenate concentration, sulfur content, cetane number, cetane index, cloud point, flash point, kinematic viscosity, copper strip corrosion, Ramsbottom carbon residue, ash content, freeze point, vapor pressure, hydrogen content, naphthalene content, smoke point, luminometer number, corrosion, net heat of combustion, viscosity, viscosity index, and volatility.

31. The method of claim 19 or 25, wherein the predetermined value or characteristic is included in a listing or database of one or more characteristics or values of the liquid being transported.

* * * * *

UNITED STATES PATENT AND TRADEMARK OFFICE
CERTIFICATE OF CORRECTION

PATENT NO. : 6,966,326 B2  Page 1 of 1
APPLICATION NO. : 10/458738
DATED : November 22, 2005
INVENTOR(S) : Jack B. Murray et al.

It is certified that error appears in the above-identified patent and that said Letters Patent is hereby corrected as shown below:

Title page, item [73] should read --ExxonMobil Research and Engineering Company--

Signed and Sealed this

Twelfth Day of December, 2006

JON W. DUDAS
*Director of the United States Patent and Trademark Office*